United States Patent
Foltz

(10) Patent No.: US 10,635,489 B2
(45) Date of Patent: *Apr. 28, 2020

(54) PROXY OBJECT SYSTEM

(71) Applicant: MICROSOFT TECHNOLOGY LICENSING, LLC, Redmond, WA (US)

(72) Inventor: Forrest Curtis Foltz, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,478

(22) Filed: Dec. 10, 2018

(65) Prior Publication Data

US 2019/0121667 A1 Apr. 25, 2019

Related U.S. Application Data

(63) Continuation of application No. 15/012,508, filed on Feb. 1, 2016, now Pat. No. 10,152,351.

(51) Int. Cl.
| | |
|---|---|
| G06F 9/44 | (2018.01) |
| G06F 9/48 | (2006.01) |
| G06F 8/65 | (2018.01) |
| G06F 9/445 | (2018.01) |
| G06F 13/362 | (2006.01) |
| G06F 13/10 | (2006.01) |

(52) U.S. Cl.
CPC .............. G06F 9/4881 (2013.01); G06F 8/65 (2013.01); G06F 9/44521 (2013.01); G06F 9/485 (2013.01); G06F 13/102 (2013.01); G06F 13/362 (2013.01)

(58) Field of Classification Search
None
See application file for complete search history.

(56) References Cited

U.S. PATENT DOCUMENTS

2007/0174849 A1 * 7/2007 Cheung .................. G06F 8/656 719/321

* cited by examiner

*Primary Examiner* — Qamrun Nahar
(74) *Attorney, Agent, or Firm* — Shook, Hardy & Bacon, LLP

(57) ABSTRACT

In various embodiments, methods and systems, for implementing proxy objects are provided. A task request directed to a driver component is intercepted at a proxy object component. The task request is an Input/Output or a session task. A proxy object is generated for the task request at the proxy object component. The task request is communicated from the proxy object component to the driver component. A modification indication to modify the driver component is received. A standby mode is initiated at the proxy object component and the driver component, the standby mode comprises processing task requests and proxy objects based on standby operations. A determination that the driver component has been modified to a modified version of the driver component is made. A recovery mode is initiated at the proxy object component and the driver component, the recovery mode comprises processing task requests and proxy objects based on recovery operations.

20 Claims, 7 Drawing Sheets

PROXY OBJECT SYSTEM

CROSS-REFERENCE TO RELATED APPLICATIONS

This application is a continuation of application Ser. No. 15/012,508 which was filed on Feb. 1, 2016, and issued on Dec. 11, 2018 and is assigned patent Ser. No. 10/152,351, entitled "PROXY OBJECT SYSTEM". The contents of which are herein incorporated by reference in its entirety.

BACKGROUND

Computing devices, components and systems operate based on drivers. A driver is a computer program that facilitates operating or controlling a type device, component or system. For example, a driver can provide a software interface to a hardware device to enable an operating system and other computer programs to access hardware functions without needing to know the precise details of the hardware being used. Drivers can also be associated with virtual hard disks (VHD). A virtual hard disk can be associated with a physical hard disk drive (HDD). A VHD allows multiple operating systems to reside on a single host machine (e.g., node). Typically, replacing VHD drivers cannot be performed without shutting down a virtual machine (VM) using the VHD and VHD drivers on the node. The VM supporting tenant applications and services on the node actively uses the VHD and the VHD drivers. In this regard, active resources (e.g., open file handles) of the VHD have to be closed and then the VM shutdown before unloading and loading new VHD drivers. As such, a system for obviating shutdowns of VMs, to upgrade drivers, can improve uptime and business continuity of the VMs and facilitate changing drivers.

SUMMARY

Embodiments described herein provide methods and systems for seamless modification of software components in distributed computing systems based on a proxy object system. At a high level, the proxy object system leverages an agent-principal-based mechanism, to allow for limited disruption in operations when modifying software components. The proxy object operates as an agent for a software component, the principal, to prevent downtime when modifications to the software component are made. The proxy object system can be implemented based on a proxy object component that supports an interface for communication, storage for preserving state information, and proxy objects (proxy count objects, proxy reference objects), as part of the proxy object system framework. By way of example, a virtual machine (VM) operating system may use a software component (e.g., virtual hard disk (VHD) driver component) to support access to system resources (e.g., file system on a VHD). The software component is configured with a proxy object component that uses the agent-principal-based mechanism to operate the software component, such that, modification to the software component can be performed with limited interruptions to the VM (e.g., the VM is not shutdown in order to upgrade the software component).

In operation, the proxy object component receives or intercepts task requests to be processed using the software component. The proxy object component generates a proxy object for the task to account for the task within the proxy object component. The tasks may be Input/Output (I/O) tasks for communications or session tasks (e.g., open handle to a file) for sustained processing. As such, the proxy object component is also configured to determine whether a task request is for an I/O task or a session task and to process the task request based on the type of task determined. For example, for an I/O task, the proxy object generated is a proxy count object that tracks any I/O tasks that are active on the software component, and for a session task, the proxy object generated is a proxy reference object.

Upon receiving an indication to modify the software component, the proxy object component initiates a standby mode to cause processing based on standby operations at the proxy object component and the software component. The standby operations can include finalizing I/O tasks being processed based on counting proxy count objects tracked at the proxy object component to confirm that all I/O tasks have been processed. For example, a counter associated with the proxy count objects is determined to be at zero (i.e., no active proxy count objects at the software component) before proceeding with the modification of the software component. Also, the standby operations include facilitating the closing of session tasks (e.g., open handles to files) at the software component; however, the corresponding proxy reference objects in the proxy object component are placed in a pending state. In addition, new task requests received at the proxy object component are placed in a pending state and not processed immediately. The proxy object component can also facilitate preserving and restoring state information of the software component.

After accounting for the proxy count objects, the proxy reference objects, and new incoming task requests, the software component can be taken down, modified, and brought back up, without having to shut down the VM associated with the software component. The proxy object component can then initiate a recovery mode to cause processing based on recovery operations at the proxy object component and the software component. The recovery operations can include regenerating reference objects for proxy reference objects that were placed in a pending state at the proxy object component and processing new task requests that were also placed in pending state when received during the standby mode. The modified software component can also retrieve the preserved state information and continue normal software component operations.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
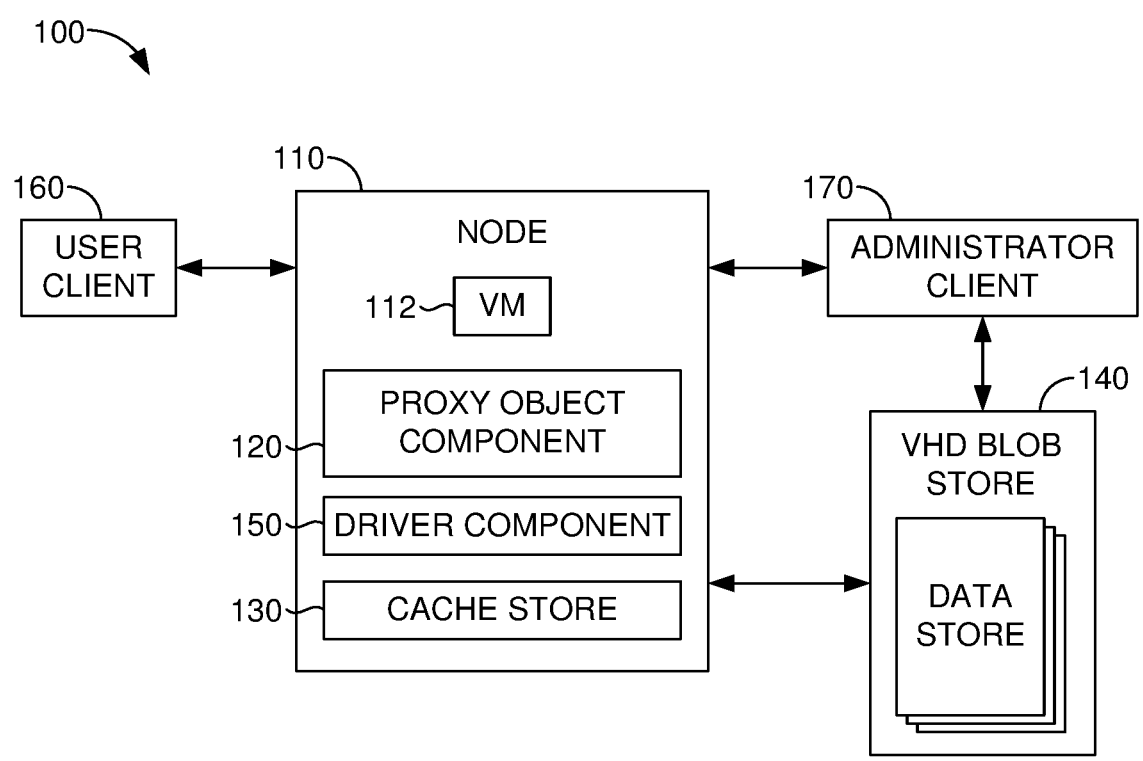
FIG. 1 is a block diagram of an exemplary proxy object system environment in which embodiments described herein may be employed.

Computing devices, components and systems operate based on software components called drivers. A driver is a computer program facilitates operating or controlling a type device, component or system. For example, a driver can provide a software interface to a hardware device to enable an operating system and other computer programs to access hardware functions without needing to know the precise details of the hardware being used. Drivers can also be associated with virtual hard disks (VHD). A virtual hard disk can be associated with a physical hard disk drive (HDD). A VHD allows multiple operating systems to reside on a single host machine (e.g., node).

VHDs can be implemented in scalable infrastructures referred to as cloud computing infrastructures. Cloud computing infrastructures (i.e., distributed computing systems) support operations on a shared pool of configurable computing, storage, and networking resources. For example, a cloud computing infrastructure can implement a compute node configured to run multiple virtual machines (VMs) supported by on operating system (OS). Compute nodes provision resources assigned to VMs. The VMs support operation of one or more hosted application and/or services (e.g., tenants) in the cloud computing infrastructure. By way of example, virtualized storage stack or compute stack functionality is supported using a Virtual Hard Drive Miniport Driver (VHDMP) which exposes block devices (i.e., devices that support reading and writing whole blocks of data at a time e.g., sector on a hard disk). Block devices mounted using the VHDMP support access to a blob interface associated with a blob store within the cloud computing storage infrastructure such that the blob store is accessible to a VM as a Virtual Hard Drive (VHD). Systems and processes for managing virtual hard drives as blobs, as used in the present disclosure, are further described in U.S. application Ser. No. 13/944,627 filed Jul. 17, 2013 entitled "Managing Virtual Hard Drives as Blobs," which is hereby incorporated herein by reference in its entirety. In addition, systems and processes for managing and controlling modular data operations, as used in the present disclosure, are further described in U.S. application Ser. No. 15/012,489 entitled "MODULAR DATA OPERATIONS SYSTEMS" which is hereby incorporated herein by reference in its entirety.

Keeping computing systems operating while modifying software components that support the computing system is valuable when the computing system have to stay operational. For example, in cloud computing infrastructures, upgrading a VHD driver without downtime can be important to customers because this provides business continuity and predictability to implementing applications and services supported via the VMs. Typically, replacing VHD drivers cannot be performed without shutting down a virtual machine (VM) using the VHD and VHD drivers on the node. The VM supporting tenant applications and services on the node are actively using the VHD and the VHD drivers; in this regard, active resources of the VHD have to be closed and the VM shutdown before unloading and loading new VHD drivers. As such, a system for obviating shutdowns of VMs to upgrade drivers can improve business continuity and uptime of the VMs and facilitate changing drivers.

Embodiments of the present disclosure provide simple and efficient methods and systems for implementing a proxy object system in a distributed computing system. At a high level, the proxy object system leverages an agent-principal-based mechanism, to allow for limited disruption in operations when modifying software components. The proxy object operates as an agent for a software component, the principal, to prevent downtime when modifications to the software component are made. The proxy object system can be implemented based on a proxy object component that supports an interface for communication, storage for preserving state information, and proxy objects (proxy reference objects, proxy count objects), as part of the proxy object system framework. By way of example, a virtual machine (VM) operating system may use a software component (e.g., virtual hard disk (VHD) driver component) to support access to system resources (e.g., file system on a VHD). The software component is configured with a proxy object component that uses an agent-principal-based mechanism to operate the software component, such that, modification to the software component can be performed with limited interruptions to the VM (e.g., the VM is not shutdown in order to upgrade the software component).

In operation, the proxy object component receives or intercepts task requests to be processed using the software component. The proxy object component generates a proxy object for the task to account for the task within the proxy object component. The tasks may be Input/Output (I/O) tasks for communications or session tasks (e.g., open handle to a file) for sustained processing. As such, the proxy object component is also configured to determine whether a task request is for an I/O task or a session task and to process the task request based on the type of task determined. For example, for an I/O task, the proxy object generated is a proxy count object that tracks any I/O tasks that are active on the software component, and for a session task, the proxy object generated is a proxy reference object.

Upon receiving an indication to modify the software component, the proxy object component initiates a standby mode to cause processing based on standby operations at the proxy object component and the software component. The standby operations can include finalizing I/O tasks being processed based on counting proxy count objects tracked at the proxy object component to confirm that all I/O tasks have been processed. For example, a counter associated with the proxy count objects is determined to be at zero (i.e., no active proxy count objects at the software component) before proceeding with the modification of the software component. Also, the standby operations include facilitating the closing of session tasks (e.g., open handles to files) at the software component; however, the corresponding proxy reference objects in the proxy object component are placed in a pending state. In addition, new task requests received at the proxy object component are placed in a pending state and not processed immediately. The proxy object component can also facilitate preserving and restoring state information of the software component.

After accounting for the proxy count objects, the proxy reference objects, and new incoming task requests, the software component can be taken down, modified, and brought back up, without having to shut down the VM associated with the software component. The proxy object component can then initiate a recovery mode to cause processing based on a recovery operations at the proxy object component and the software component. The recovery operations can include regenerating reference objects for proxy reference objects that were placed in a pending state at the proxy object component and processing new task requests that were also placed in pending state when received during the standby mode. The modified software component can also retrieve and restore the preserved state information and continue normal software component operations.

Referring initially to FIG. 1, FIG. 1 illustrates an exemplary proxy object system 100 in which implementations of the present disclosure may be employed. In particular, FIG. 1 shows a high level architecture of a proxy object system 100 with a node 110 having a proxy object component 120, a cache store 130, a data store (VHD blob store) 140 and a driver component 150 in accordance with implementations of the present disclosure. Among other components not shown, the proxy object system 100 includes the node 110 running VM 112, computing devices, a user client 160 and an administrator client 170, where the node, VMs, and computing devices are described in more detail with reference to FIGS. 6 and 7.

A system, as used herein refers, to any device, process, or service or combination thereof. A system may be implemented using components as hardware, software, firmware, a special-purpose device, or any combination thereof. A system may be integrated into a single device or it may be distributed over multiple devices. The various components of a system may be co-located or distributed. The system may be formed from other systems and components thereof. It should be understood that this and other arrangements described herein are set forth only as examples.

Having identified various component of the proxy object system 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. The proxy object system 100 functionality can be further described based on the functionality and features of the above-listed components.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 2:
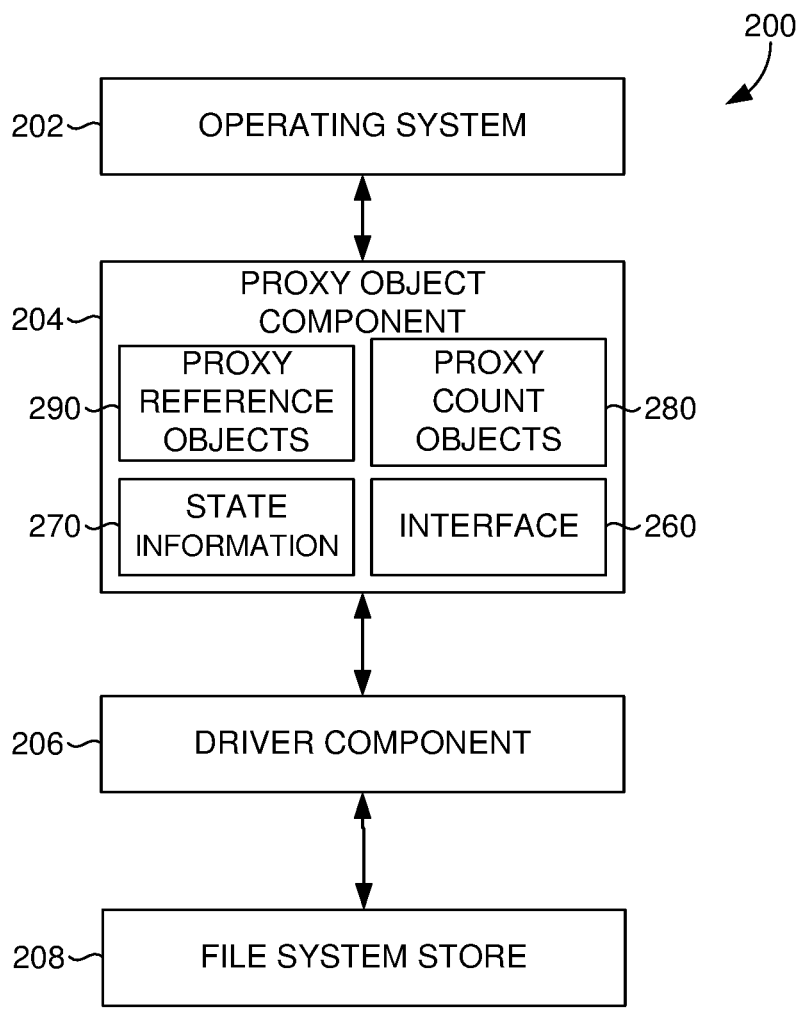
FIG. 2 is a block diagram of an exemplary proxy object system in which embodiments described herein may be employed.

Embodiments of the present disclosure are described in detail below with reference to examples such as file system operations supported using the driver component 150, cache store 130 and a data store (VHD blob store) 160. Additionally, exemplary tasks (e.g., I/O tasks and session tasks) are discussed. Nonetheless, the specific examples indicated are not meant to be limiting. In one exemplary embodiment, as shown in FIG. 2, the proxy object system 200 includes a proxy component 204 having an interface 260 for communication, storage for preserving state information 270, and proxy objects (proxy count objects 280, proxy reference objects 290), as part of the proxy object system framework. At a high level, the proxy object system leverages an agent-principal-based mechanism, to allow for limited disruption in operations when modifying software components. The proxy object operates as an agent for a software component, the principal, the prevent downtime when modifications to the software component.

With continued reference to FIG. 2, FIG. 2 illustrates an exemplary proxy object system 200 having an operating system 202, a proxy object component 204, a driver component 206, a file system store 208 (e.g., a backing store (VHD blob store) and cache store). The operating system 202 is responsible for processing operations in the virtual machine and or node. The operating system 202 manages computer hardware and software resources and provides common services for programs. In particular, the operating system 202 supports operations for providing proxy object system functionality. The operating system 202 handles task requests to perform operations on the virtual machine. The operating system 202 receives requests to access resources associated with the virtual machine. For example, the operating system 202 can receive task requests for access to files in a file system. The task request may be an Input/Output (I/O) task communication or a session tasks that opens a file handle to access a file. In this regard, I/O tasks can be completed relatively quickly when a file is accessed or information is retrieved to satisfy the I/O task, while during session tasks, file handles may be opened for a period of time because when a file is opened for processing. For example, a file handle is associated with the file until either the process terminates or the handle is closed. Other types of variations and combinations of task requests are contemplated with embodiments of the present disclosure.

The driver component 206 is responsible for processing task requests received via the operating system for access to system resources. A driver component 206 can generally refer to a program that supports functionality of a hardware or software component. The driver component 206 may be included as part of the operating system or initialized and deployed separately. The driver component 206 can support communication with system resources that utilize a driver. By way of example, access to a virtual hard disk (VHD) can be supported using a driver. The driver component 206 can also have specific functionality (e.g., redirector driver for a file system or data access component driver for managing and controlling data operations) that components of the driver component support. By way of example, the driver component 206 may specifically support a file proxy in a file proxy format that is used to redirect data access request to a file system store (e.g., a cache store or a backing store). A requesting entity (e.g., user client 160 via a VM) directs the data access request to a VHD that is mounted as a block device but operates to provide access to the backing store based on the redirector driver component converting a data request from a file proxy format to a blob store format. Also the driver component 206 may also be a data access component that uses a backing store, and a cache store also and implements cache store data structures, cache block lazy writing and data access throttling as part of a modular data operations systems. The driver component 206 works with the operating system to processing the task requests to access the file system store 208. The driver component 206 processes I/O tasks and session tasks as described hereinabove.

The proxy object component 204 operates to facilitate seamless modification of a driver component associated with the proxy object component 204. The proxy object component 204 may be initialized or integrated as part a driver component 206 to specifically support the functionality of the driver component 206 by way of an agent-principal mechanism. The proxy object component 204 operates as an agent for the driver component 206, the principal, to prevent downtime when modifications to the driver component 206 are made. The proxy object component 206 can be implemented based on the proxy object component 206 supporting the interface 260 for communication, storage for preserving state information 270, and proxy objects (proxy count objects 280, proxy reference objects 290). The proxy object component 204 receives or intercepts task requests communicated to the operating system 202 that are directed to the driver component to perform I/O tasks or session tasks. The proxy object component 204 can intercept the task request and in one implementation determine whether the task is an I/O task or session task in order to perform additional processing.

The proxy object component 204 is responsible for generating a proxy object for a task request and communicating the task request to the driver component 206. The proxy object component 204 generates a proxy object for a task request in advance of a modification to the driver component 206 in order to obviate shutting down the driver component prior to the modification of the driver component 206. Proxy objects that are generated correspond to driver component 206 objects that are generated based on the task requests when the task requests are processed at the driver component 206. The proxy object component 204 generates a proxy object based on the type of task request that is intercepted. As such, when the proxy object component 204 determines that the task request is an I/O task, the proxy object component 204 generates a proxy count object and when the proxy object component 206 determines that the task request is a session task request the proxy object component 206 generates a proxy reference object.

The proxy count objects 280 can be implemented as a counter that tracks I/O tasks. The counter is increased when the I/O task is processed as an input and the count is decreased when the task is processed as an output. Communicating and processing the I/O task to and from the driver component 206 via the proxy object component 204 is an indication that the I/O task has been completed no longer needs be tracked at the proxy object component 204. The counter keeps track of any active I/O tasks at the driver component 206. The proxy reference objects 290 can be implemented pointers to a corresponding reference object at the driver component. The pointer acts a reference in the proxy object component 204 to the reference object that is at the driver component 206. A proxy reference object can be deleted when the driver component 206 has completed processing the session task associated with the reference object. The proxy object component 204 communicates the task request to the driver component 206 to cause processing of the task request at the driver component 206. The driver component 206 may operate while being unaware of the interception and processing performed at the proxy object component 204.

The proxy object component 204 is responsible to determining that a modification indication to the driver component 206 has been requested and implementing a standby mode before the modification is made to the driver component and a subsequent recovery mode when the modification has been performed. The modification indication can be communicated from a computing device (e.g., administrator client 170) based on administrator of the driver component 206 electing to perform software maintenance of the running driver component 206. The proxy object component 204 can determine or receive a modification indication in several different ways. For example, the operating system 202 may send a communication to the driver component 206 to shutdown, in order to, modify the driver component 206, and then the driver component 206 can forward this communication to the proxy object component 204. The proxy object component 204 can also implement the interface 260 as a proxy for communications to the driver component 206 such that the proxy object component 204 intercepts communications to the driver component 206. As such, the proxy object component 204 is able to receive the communication that a modification to the driver component 206 is to be performed. The modification indication or communication can be for software maintenance to be performed on the driver component 206. The modification may generally to relate to adaptive, perfective, corrective, and preventive changes to the driver component 206. A modified version of the driver component 206 replaces the previous version of the driver component 206. For example, a new version of the driver component can be installed and the old version uninstalled. Other variations and communications of methods of communicating an indication of the modification operations to be performed on the driver component and types of modification operations to be performed are contemplated with embodiments of the present disclosure.

The proxy object component 204 is responsible for initiating a standby mode that executes standby operations. The standby mode is associated with the proxy object component 204 and the driver component 206 to perform standby operations associated with each of the components. Standby operations refer to actions that put incoming task requests in a pending state at the proxy object component, wind down processing of I/O tasks and session tasks at the driver component, and place corresponding proxy reference objects of reference objects in the driver component 206 in a pending state. For example, the proxy component 204 can determine that the proxy count objects have been processed and decrease the counter for each I/O task that is processed completely. The proxy object component 204 can also determine that the reference object corresponding to a proxy reference object is closed at the driver component 206. The proxy object component 206 then places the proxy reference object and one or more new task requests, being received at the proxy object component 206, in a pending state. The proxy object component 204 can then communicate with the operating system to begin the modification of the driver component 206. The proxy object component 204 may then determine or receive an indication that the driver component has been modified to a modified version of the driver component 206.

The proxy object component 204 is also responsible for initiating a recovery mode that executes recovery operations. The recovery mode is associated with the proxy object component 204 and the driver component 206 to perform recovery operations associated with each of the components. Recovery operations refer to actions that cause a reference object to be regenerated for proxy reference objects that are put prior to modification of the driver component 206 in pending state at the proxy object component 204; process the new task request in pending state at the proxy object component; and communicate the new task request for processing at the driver component 206, now modified. For example, a request is communicated to have reference objects regenerated for proxy reference objects in a pending state and the one or more new task requests, received during modification of the driver component 206, are processed as proxy count objects or proxy reference objects and communicated to the driver component 206, now modified.

The proxy object component 204 can also include standby operations and recovery operations that preserve and restore state information of the driver component. The state information can refer to values of data variables of the driver component, for example, the content of memory location at any given time in the driver component 206 execution. The state information may be a snapshot of the data variables or contents of memory taken before the modification of driver component 206. The standby operations can include actions that communicate messages for saving the driver component state information. The state information is saved such that upon modification of the driver component 206, to the modified driver component, the state information can be retrieved and restored at the modified driver component. The recovery operations include actions that communicate messages for retrieving and restoring the state information to the modified driver component. The state information can be stored in association with the proxy object component 204. By way of example, in a standby mode, standby operations can include the proxy object component communicating a request to the driver component 206 to save and communicate the state information to the proxy object component 204 and the proxy object component 204 stores the state information. And then, in the recovery mode, recovery operations can include communicating the state information to a modified driver component to cause to the modified driver component to restore the state information and begin processing task requests based at least in part on the restored state information. Other variations and combinations of methods for preserving and restoring state information from the driver component 206 are contemplated with embodiments of the present disclosure.

Figure 3:
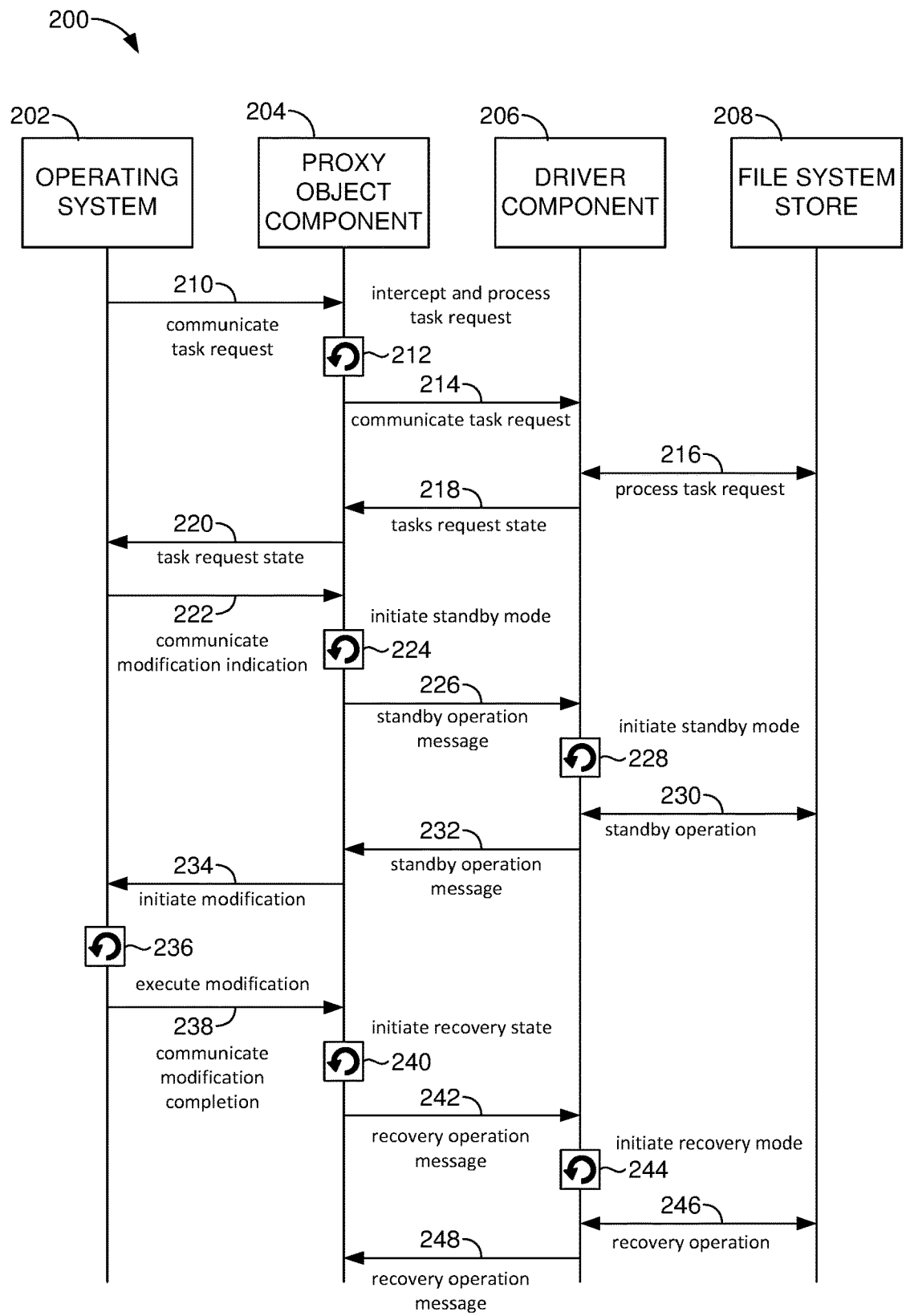
FIG. 3 is a block schematic of an exemplary implementation of a proxy object system, in accordance with embodiments described herein.

With reference to FIG. 3, a schematic illustration of a system and method for implementing a proxy object component is provided. FIG. 3 includes operating system 202, proxy object component 204, driver component 206 and file system store 208. At step 210, the operating system 202 communicates a task request to the driver component 206. At step 212, the proxy object component 204 intercepts the task request directed to the driver component 206 and processes the task request. Processing the task request includes the proxy object component 204 determining whether the task request is an I/O task or a session task to generate a proxy object based on whether the task request is for an I/O task or a session task. In particular, a proxy count object is generated when the task request is an I/O task and a proxy reference object is generated when the task is a session task. The proxy count object is implemented as a counter that tracks I/O tasks, such that, the counter is increased when the I/O task is communicated as an input and the counter is decreased when the I/O task is communicated as an output. The proxy reference object is implemented as a pointer to a corresponding reference object in the driver component 206.

At step 214, the proxy object component 204 communicates the task request to cause processing of the task request at the driver component 206. The driver component 206 processes the I/O task or session task. At step 216, the driver component 206 communicates with file system store 208, to process the task request. In particular, processing the I/O task includes receiving the input and communicating an output from the file system store 208 and processing the session task includes opening a file handle for accessing a file in the file system store 208. At step 218, a task request state can be communicated from the driver component to the proxy object component. For example, I/O task can be processed and completion of the I/O task communicated, such that, the I/O proxy count object is decreased at a counter at the proxy object component 204, or a session task proxy reference object is closed when the handle associated with the reference object at the driver component is closed. At step 220, the operating system can also receive task request state information, for example, a message indicating completion of an I/O task or a message communicated to indicate that an open file handle exists for a file and an application to begin accessing a file from the file system store 208.

At step 222, the operating system 202 can communicate a modification indication to the proxy object component 204. The modification indication can communicate a software maintenance (e.g., driver upgrade or downgrade) to be performed on the driver component 206 that would require shutdown of the driver component 206. At block 224, the proxy object component 204 receives the modification indication to modify the driver component 206 and then the proxy object component 204 initiates a standby mode that executes standby operations. Standby operations are performed at the proxy object component 204 and the driver component 206 to allow the operating system 202 to modify the driver component 206 to a modified driver component. In particular, the standby operations can include communicating messages, at step 226 to the driver component to cause standby operations to be performed; at step 228, processing messages at driver component 206 based on initiating the standby mode; at step 230 communicating messages with the file system store 208; and at step 232, receiving messages at the proxy object component 204; steps 226-232 facilitate determining that the proxy count object has been processed; determining that a reference object in the driver component 206 corresponding to a proxy reference object is closed at the driver component 206; placing the proxy reference object and one or more new task requests, being received during the standby mode, in a pending state; and preserving state information of the driver component 206, where the state information is retrieved and restored on the modified driver component.

At step 234, the proxy object component 234 communicates to the operating system 202 an indication that the operating system 202 can begin modification of the driver component 206. At step 236, the operating system 202 executes the modification to perform the software maintenance. At step 238, the operating system 202 communicates to the proxy object component 204 that the modification has been completed.

At block 240, the proxy object component 204 receives the communication that the modification has been completed and then the proxy object component 204 initiates a recovery mode that executes recovery operations. Recovery operations are performed at the proxy object component 204 and the driver component 206 (the modified driver component) to allow processing of objects, at the proxy object component in pending state and new task requests, using the modified driver component. In particular, the recovery operations can include communicating messages, at step 242 to the driver component 206 to cause recovery operations to be performed; at step 244, processing messages at driver component 206 based on initiating the recovery mode; at step 246, communicating messages with the file system store 208; and at step 248, receiving messages at the proxy object component 204; steps 242-248 facilitate retrieving and restoring, at the modified driver component, state information preserved from the driver component prior to the driver component 206 being modified; regenerating a reference object, in the modified driver component, for the proxy reference object in a pending state; and communicating the one or more new task requests in the pending state for processing at the modified driver component.

Figure 4:
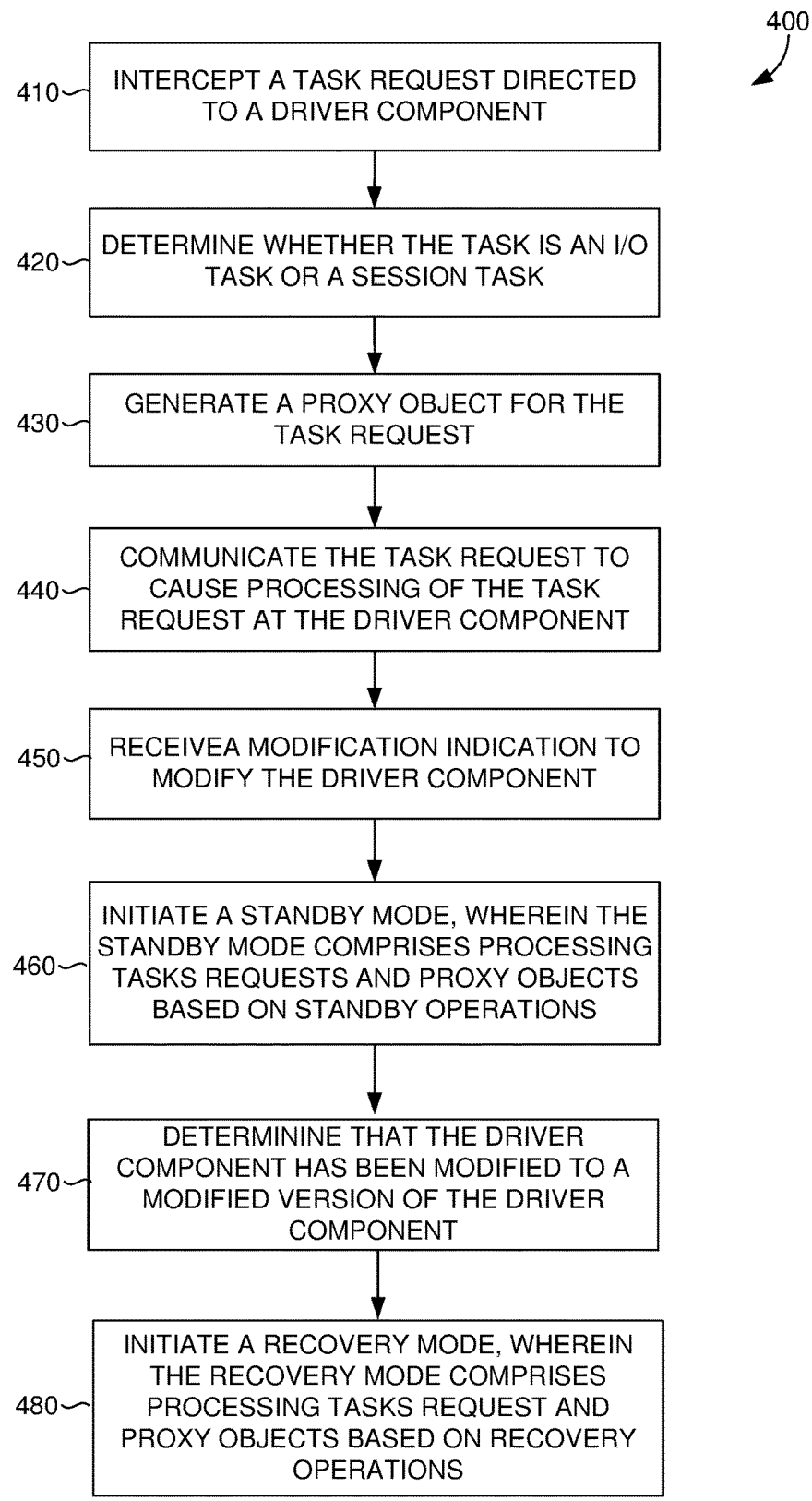
FIG. 4 is a flow diagram showing an exemplary method for implementing a proxy object system, in accordance with embodiments described herein.

Turning now to FIG. 4, a flow diagram is provided that illustrates a method 400 for implementing a proxy object system. Initially at block 410, a task request directed to a driver component is intercepted. At block 420, a determination whether the task request is an Input/Output (I/O task) or a session task is made. At block 430, a proxy count object is generated when the task request is an I/O task and a proxy reference object is generated when the task is a session task. At block 440, the task request is communicated to cause processing of the task request at the driver component. At block 450, a modification indication to modify the driver component is received. At block 460, a standby mode that executes standby operations is initiated; the standby mode comprises processing task requests and proxy objects based on standby operations. At 470, a determination that the driver component has been modified to a modified version of the driver component is made. At 480, a recovery mode that executes recovery operations is initiated; the recovery mode comprises processing task request and proxy objects based on recovery operations.

Figure 5:
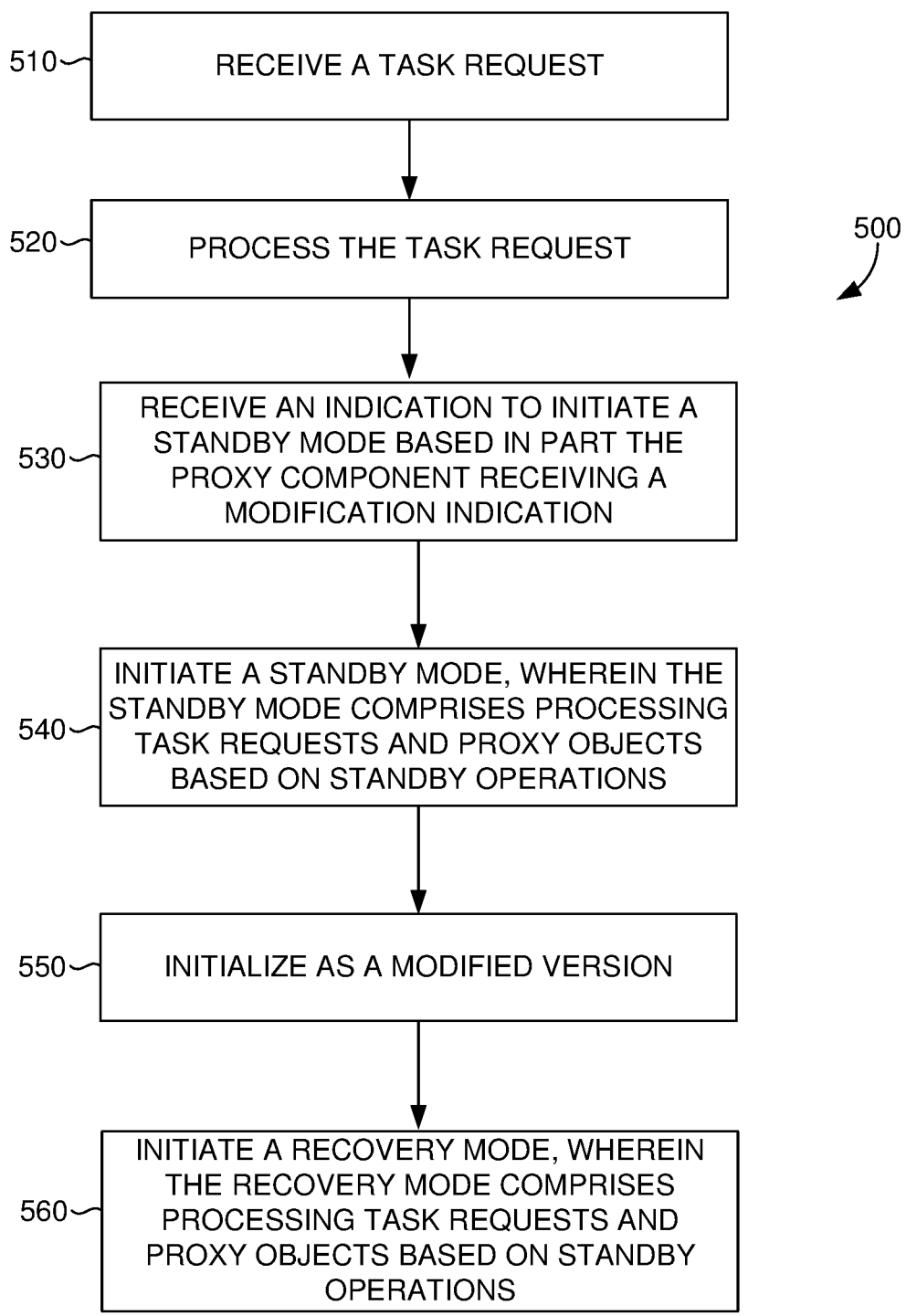
FIG. 5 is a flow diagram showing an exemplary method for implementing a proxy object system, in accordance with embodiments described herein.

Turning now to FIG. 5, a flow diagram is provided that illustrates a method 500 for implementing a proxy object system. Initially at block 510, a task request is received at a driver component, from a proxy object component. At block 520, the task request is processed at the driver component. The task request is processed based on the task request being an I/O task request or a session task request. At block 530, an indication to initiate a standby mode is received, based in part on the proxy object component receiving a modification indication. The modification indication communicates that the driver component is to be modified. At block 540, the standby mode is initiated at the driver component. The standby mode comprises processing task requests and proxy objects based on standby operations. The standby operations at the driver component include processing I/O tasks active on the driver component, without accepting new I/O tasks; closing reference objects at the driver component, the reference objects having corresponding proxy reference objects; preserving state information of the driver component; and initiating shut down of the driver component.

At block 550, the modified version of the driver component is initialized. At block 560, upon initializing the modified driver component, a recovery mode is initiated. The recovery mode comprises processing task requests and proxy objects based on recovery operations. The recovery operations at the driver component include retrieving and restoring state information preserved from the driver component prior to being modified; regenerating reference objects for proxy reference objects on the proxy object component in a pending state; and processing one or more task requests, the new tasks requests are removed from a pending state at the proxy object component and communicated to the driver component for processing.

With reference to the proxy object system, embodiments described herein leverage an agent-principal-based mechanism, to allow for limited disruption in operations when modifying software components. The proxy object system service platform components refer to integrated components for managing access to data. The integrated components refer to the hardware architecture and software framework that support data access functionality using the proxy object system service platform. The hardware architecture refers to physical components and interrelationships thereof and the software framework refers to software providing functionality that can be implemented with hardware operated on a device. The end-to-end software-based proxy object system service platform can operate within the proxy object system service platform components to operate computer hardware to provide proxy object system service platform functionality. As such, the proxy object system service platform components can manage resources and provide services for the proxy object system functionality. Any other variations and combinations thereof are contemplated with embodiments of the present invention.

By way of example, the proxy object system service platform can include an API library that includes specifications for routines, data structures, object classes, and variables may support the interaction the hardware architecture of the device and the software framework of the proxy object system service platform system. These APIs include configuration specifications for the proxy object system service platform system such that the driver component and component therein can communicate with each other in the proxy object system service platform, as described herein.

Figure 6:
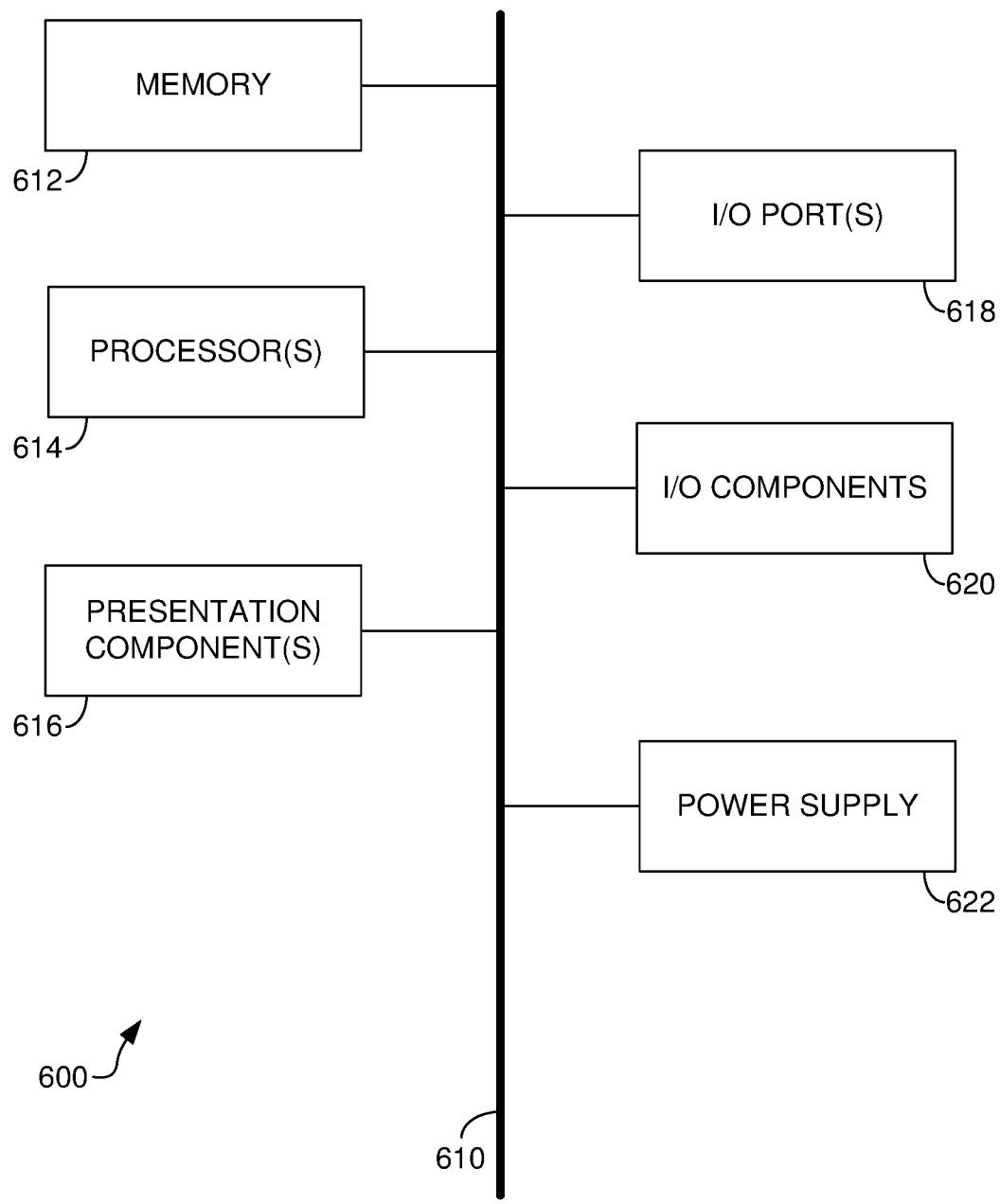
FIG. 6 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Figure 7:
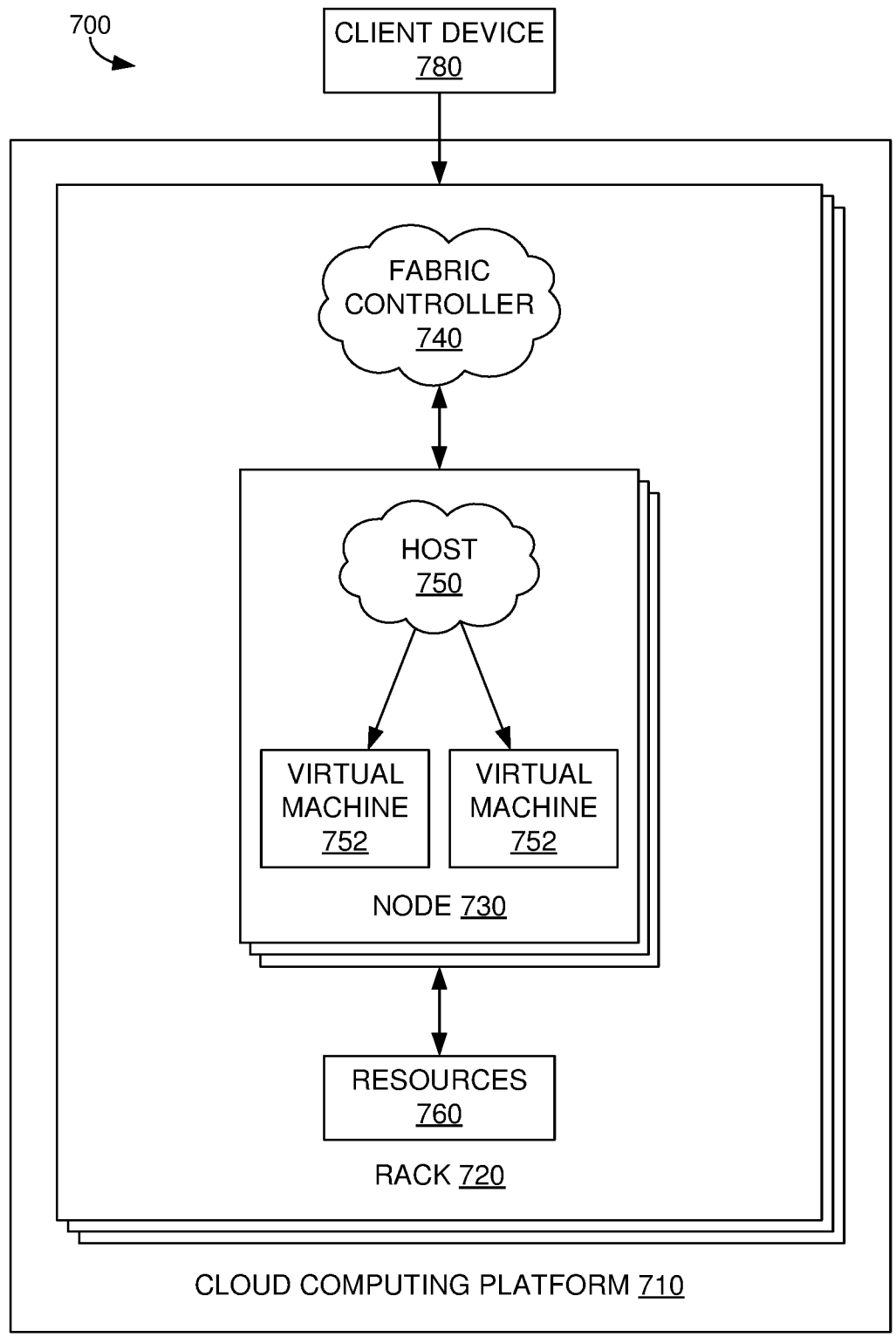
FIG. 7 is a block diagram of an exemplary distributed computing system suitable for use in implementing embodiments described herein.

Referring now to FIG. 7, FIG. 7 illustrates an exemplary distributed computing environment 700 in which implementations of the present disclosure may be employed. In particular, FIG. 7 shows a high level architecture of the proxy object system ("system") in a cloud computing platform 710, where the system supports seamless modification of software component. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 700 that includes the cloud computing platform 710, rack 720, and node 730 (e.g., computing devices, processing units, or blades) in rack 720. The system can be implemented with a cloud computing platform 710 that runs cloud services across different data centers and geographic regions. The cloud computing platform 710 can implement a fabric controller 740 component for provisioning and managing resource allocation, deployment, upgrade, and management of cloud services. Typically, the cloud computing platform 710 acts to store data or run service applications in a distributed manner. The cloud computing infrastructure 710 in a data center can be configured to host and support operation of endpoints of a particular service application. The cloud computing infrastructure 710 may be a public cloud, a private cloud, or a dedicated cloud.

The node 730 can be provisioned with a host 750 (e.g., operating system or runtime environment) running a defined software stack on the node 130. Node 730 can also be configured to perform specialized functionality (e.g., compute nodes or storage nodes) within the cloud computing platform 710. The node 730 is allocated to run one or more portions of a service application of a tenant. A tenant can refer to a customer utilizing resources of the cloud computing platform 710. Service application components of the cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 730, the nodes may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in the cloud computing platform 710. It is contemplated that resources can be configured for specific service applications. Further, each service application may be divided into functional portions such that each functional portion is able to run on a separate virtual machine. In the cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 180 may be linked to a service application in the cloud computing platform 710. The client device 780 may be any type of computing device, which may correspond to computing device 700 described with reference to FIG. 7, for example. The client device 780 can be configured to issue commands to cloud computing platform 710. In embodiments, client device 780 may communicate with service applications through a virtual Internet Protocol (IP) and load balancer or other means that directs communication requests to designated endpoints in the cloud computing platform 710. The components of cloud computing platform 710 may communicate with each other over a network (not shown), which may include, without limitation, one or more local area networks (LANs) and/or wide area networks (WANs).

Having described various aspects of the distributed computing environment 700 and cloud computing platform 710, it is noted that any number of components may be employed to achieve the desired functionality within the scope of the present disclosure. Although the various components of FIG. 7 are shown with lines for the sake of clarity, in reality, delineating various components is not so clear, and metaphorically, the lines may more accurately be grey or fuzzy. Further, although some components of FIG. 7 are depicted as single components, the depictions are exemplary in nature and in number and are not to be construed as limiting for all implementations of the present disclosure.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

[Pending Final Claim Set for Literal Support for PCT Claims]

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a head-mounted display unit; however the head-mounted display unit depicted herein is merely exemplary. Components can be configured for performing novel aspects of embodiments, where configured for comprises programmed to perform particular tasks or implement particular abstract data types using code. Further, while embodiments of the present invention may generally refer to the head-mounted display unit and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. One or more computer storage media having computer-executable instructions embodied thereon that, when executed, by one or more processors, causes the one or more processors to perform a method for implementing a proxy object system, the method comprising:
   receiving, at a proxy object component, a modification indication to modify a driver component;
   initiating a standby mode at the proxy object component, that executes standby operations, wherein the standby operations comprise:
   processing task requests and proxy objects based on the standby operations, wherein the standby operations include placing one or more new task requests in a pending state;
   determining that the driver component has been modified to a modified version of the driver component;
   initiating a recovery mode at the proxy object component and the driver component, that executes recovery operations, wherein the recovery operations comprise:
   processing task requests and proxy objects based on the recovery operations.

2. The media of claim 1, wherein the proxy count object is implemented as a counter that tracks I/O tasks such that the counter is increased when the I/O task is communicated as an input and the counter is decreased when the I/O task is communicated as an output.

3. The media of claim 1, wherein a proxy reference component is implemented as a pointer to a corresponding reference object in a driver component.

4. The media of claim 1, wherein the standby operations further comprise preserving state information of a driver component, the state information is retrieved and stored for the modified version of the driver component.

5. The media of claim 1, wherein the recovery operations further comprise restoring, at a modified version of a driver component, state information preserved from the driver component.

6. The media of claim 1, wherein at a driver component, the standby operations further include:
   processing I/O tasks active on the driver component, without accepting new I/O tasks;
   closing reference objects at the driver component, the reference objects having corresponding proxy reference objects; and
   initiating shut down of the driver component; and
   wherein, at the modified version of the driver component, the recovery operations include:
   regenerating reference objects for reference objects on the proxy object component; and
   processing one or more new task requests, wherein the one or more new task requests are removed from a pending state at the proxy object component and communicated to the driver component.

7. A computer-implemented method for implementing proxy object system, the method comprising:
receiving, at a proxy object component, a modification indication to modify a driver component;
initiating a standby mode at the proxy object component, wherein the standby mode comprises processing task requests and proxy objects based on standby operations, wherein the standby operations include placing one or more new task requests in a pending state;
determining that the driver component has been modified to a modified version of the driver component;
initiating a recovery mode at the proxy object component and the driver component, wherein the recovery mode comprises processing tasks requests and proxy objects based on recovery operations.

8. The method of claim 7, further comprising:
determining whether a task request is an Input/Output (I/O task) or a session task; and
generating a proxy count object when the task request is an I/O task and generating a proxy reference object when the task is a session task.

9. The method of claim 8, wherein the proxy count object is implemented as a counter that tracks I/O tasks such that the counter is increased when the I/O task is communicated as an input and the counter is decreased when the I/O task is communicated as an output.

10. The method of claim 8, wherein the proxy reference component is implemented as a pointer to a corresponding reference object in the driver component.

11. The method of claim 7, wherein the standby operations include executing one or more of the following at the proxy object component:
determining that a proxy count object has been processed;
determining that a reference object corresponding to a proxy reference object is closed at the driver component; and
placing the proxy reference object and one or more new tasks requests being received, in a pending state; and
wherein the recovery operations comprise executing one or more of the following at the modified version of the driver component at the proxy component:
communicating a request to cause a reference object to be regenerated for the proxy reference object in the pending state; and
communicating the one or more new task requests in the pending state for processing at the modified version of the driver component.

12. The method of claim 7, wherein the standby operations further comprise communicating a request to preserve state information of the driver component to cause the driver component communicate the state information; and
wherein the recovery operations further comprise communicating a request to restore state information to the modified version of the driver component, to cause the modified version of the driver component to retrieve and restore state information preserved from the driver component.

13. The method of claim 7, wherein at the driver component, the standby operations further include:
processing I/O tasks active on the driver component, without accepting new I/O tasks;
closing reference objects at the driver component, the reference objects having corresponding proxy reference objects; and
initiating shut down of the driver component; and wherein, at the modified version of the driver component, the recovery operations include:
regenerating reference objects for proxy reference objects on the proxy object component; and
processing one or more new task requests, wherein the one or more new tasks requests are removed from a pending state at the proxy object component and communicated to the modified version of the driver component.

14. A system for implementing modular data operations, the system comprising:
one or more hardware processors; and
one or more computer-readable storage media having executable instructions embodied thereon, which, when executed by the one or more hardware processors, cause the one or more hardware processors to execute:
a proxy object component configured to:
receive a modification indication to modify the driver component;
initiate a standby mode, wherein the standby mode comprises processing tasks requests and proxy objects based on standby operations, wherein the standby operations include placing one or more new task requests in a pending state;
determining that the driver component has been modified to a modified version of the driver component; and
initiating a recovery mode at the proxy object component and the driver component, wherein the recovery mode comprises processing tasks requests and proxy objects based on recovery operations.

15. The system of claim 14, further comprising a driver component configured to:
receive a task request directed from the proxy object component;
process the proxy request;
receive an indication to initiate the standby mode, based on the proxy component receiving the modification indication;
initiate the standby mode, wherein the standby mode comprises processing tasks requests based on standby operations;
initialize a modified version of the driver component; and
initiate the recovery mode, wherein the recovery mode comprises processing tasks requests based on recovery operations.

16. The system of claim 14, wherein the standby operations at the proxy object component comprise:
determining that a proxy count object has been processed;
determining that a reference object corresponding to a proxy reference object is closed at the driver component; and
placing the proxy reference object and one or more new tasks requests, being received, in a pending state.

17. The system of claim 14, wherein the standby operations at the driver component comprise:
processing I/O tasks active on the driver component, with accepting new I/O tasks;
closing reference objects at the driver component, the reference objects having corresponding proxy reference objects; and
initiating shut down of the driver component.

18. The system of claim 14, wherein the recovery operations at the proxy object component comprise:

communicating a reopen object request corresponding to a proxy reference object to cause a reference object to be regenerated for the proxy reference object; and communicating the one or more new task requests in the pending state for processing at the driver component.

19. The system of claim 14, wherein the recovery operations at the driver component comprise:

regenerating reference objects for reference objects on the proxy object component; and processing one or more task requests, wherein the new tasks requests are removed from a pending state at the proxy object component and communicated to the driver component.

20. The system of claim 14, wherein the proxy object component is further configured to:

communicate a preserve state request to the driver component to cause the driver component communicate state information to be preserved; and communicate a restore state request to a modified driver component to cause the driver component to retrieve state information preserved from the driver component.

\* \* \* \* \*